United States Patent
Ju

(10) Patent No.: US 11,668,648 B2
(45) Date of Patent: Jun. 6, 2023

(54) CONCENTRATION MEASUREMENT DEVICE AND CONCENTRATION MEASUREMENT AND CALIBRATION METHOD USING THE DEVICE

(71) Applicant: SK hynix Inc., Gyeonggi-do (KR)

(72) Inventor: Geon U Ju, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 78 days.

(21) Appl. No.: 17/173,501

(22) Filed: Feb. 11, 2021

(65) Prior Publication Data
US 2022/0003663 A1 Jan. 6, 2022

(30) Foreign Application Priority Data
Jul. 3, 2020 (KR) ......................... 10-2020-0082291

(51) Int. Cl.
*G01N 21/27* (2006.01)
*G01N 21/25* (2006.01)

(52) U.S. Cl.
CPC ......... *G01N 21/274* (2013.01); *G01N 21/255* (2013.01); *G01N 21/276* (2013.01)

(58) Field of Classification Search
CPC ................................................... G01N 21/276
See application file for complete search history.

(56) References Cited

U.S. PATENT DOCUMENTS

| | | | | |
|---|---|---|---|---|
| 3,950,101 A | * | 4/1976 | Dewey, Jr. ........... | G01N 21/274 250/341.7 |
| 4,320,970 A | * | 3/1982 | Dowben .................. | G01J 1/42 356/417 |
| 4,447,725 A | * | 5/1984 | Biggs ..................... | G01N 33/06 250/343 |
| 4,560,873 A | * | 12/1985 | McGowan ......... | G01N 21/8507 250/351 |
| 9,176,049 B2 | * | 11/2015 | Fujimoto ............... | G01N 21/07 |
| 2003/0058441 A1 | * | 3/2003 | Shakespeare ........ | G01N 21/276 356/319 |

(Continued)

FOREIGN PATENT DOCUMENTS

| KR | 10-0487055 | 5/2005 |
|---|---|---|
| KR | 10-2019-0015382 | 2/2019 |

*Primary Examiner* — Violeta A Prieto
(74) *Attorney, Agent, or Firm* — IP & T Group LLP

(57) ABSTRACT

A concentration measurement device may include a beam splitter. The concentration measurement device may include a first optical path and a second optical path. The concentration measurement device may include a rotatable disk. The first optical path and the second optical path may reach to the rotatable disk. The rotatable disk may include at least one passing portion and at least one reflecting portion. The concentration measurement device may include a light receiver configured to detect a wavelength of the first light ant second light. The concentration measurement device may include a controller comparing the wavelengths of the first and second light. The controller compares the concentration of the object material with a reference concentration of the object material to obtain concentration control information, and the controller compares the concentration of the reference material with a normal concentration of the reference material for a concentration calibration.

25 Claims, 4 Drawing Sheets

(56) References Cited

U.S. PATENT DOCUMENTS

| | | | | |
|---|---|---|---|---|
| 2008/0128622 A1* | 6/2008 | Weidmann | ......... | G01N 21/3504 |
| | | | | 250/343 |
| 2012/0091346 A1* | 4/2012 | Bitter | ................ | G01N 21/3504 |
| | | | | 250/341.7 |
| 2012/0327411 A1* | 12/2012 | Kimura | ................ | G01N 21/276 |
| | | | | 356/319 |
| 2018/0238794 A1* | 8/2018 | Kangas | ..................... | G01J 3/42 |
| 2022/0065881 A1* | 3/2022 | Kato | ..................... | G01N 21/82 |

* cited by examiner

CONCENTRATION MEASUREMENT DEVICE AND CONCENTRATION MEASUREMENT AND CALIBRATION METHOD USING THE DEVICE

CROSS-REFERENCES TO RELATED APPLICATION

The present application claims priority under 35 U.S.C. § 119(a) to Korean application number 10-2020-0082291, filed on Jul. 3, 2020, which is incorporated herein by reference in its entirety.

BACKGROUND

1. Technical Field

Various embodiments generally relate to a concentration measurement device, and a concentration measurement and calibration method using the device.

2. Related Art

A concentration of a liquid such as a cleaning solution used for a semiconductor fabrication system may be necessarily managed. The system may further include a concentration measurement device configured to manage the concentration of the liquid as well as a main apparatus for manufacturing a semiconductor device. For example, the concentration measurement device may include a cell arranged on a passage through which the liquid may flow in the main apparatus. A light may be irradiated to the cell to measure the concentrations of ingredients in the liquid based on an absorbance of the cell.

A performance of the concentration measurement device may be changed due to a deterioration of a light source, a sensitivity of a measurement member, etc. Thus, it may be required to calibrate the concentration measurement device. In order to calibrate the concentration measurement device, a semiconductor fabrication process may be suspended. A reference liquid having a predetermined concentration may flow through the cell to obtain correction data for the calibration.

Therefore, the calibration of the concentration measurement device may not be performed during the semiconductor fabrication process. Further, the concentration data in the process may not be measured during the calibration of the concentration measurement device to decreased reliability of the concentration measurement device.

SUMMARY

In various embodiments of the present disclosure, a concentration measurement device may include a light source, a beam splitter, an optical cable, a reference member, a first reflective mirror, a rotatable disk, a light receiver and a controller. The beam splitter may be configured to split a light, which may be emitted from the light source, into a first light in a first direction and a second light in a second direction. The optical cable may be connected with a sample member, which may include an object material, via an optical path to transmit the first light to the sample member and to receive the first light via the sample. The reference member including a reference material for calibrating a concentration of the object material may be positioned on an optical path of the second light. The first reflective mirror may reflect the second light to the reference member. The rotatable disk may include a passing portion configured to pass the first light via the object therethrough and a reflecting portion configured to reflect the second light via the reference material. The light receiver may be configured to detect a wavelength of the first light and a wavelength of the second light sequentially incident to the receiver by rotating the disk. The controller may be configured to control operation of the concentration measurement device. The controller may compare the wavelengths of the first and second lights with absorbance by the wavelength to calculate a concentration of the object material and a concentration of the reference material. The controller may compare the concentration of the object material with a reference concentration of the object material to obtain concentration control information. The controller may compare the concentration of the reference material with a normal concentration of the reference material to obtain correction information for a concentration calibration.

In various embodiments of the present disclosure, a concentration measurement device may include a light source, a beam splitter, a sample member, a reference member, a first reflective mirror, a rotatable disk, a light receiver and a controller. The beam splitter may be configured to split a light, which may be emitted from the light source, into a first light in a first direction and a second light in a second direction. The sample member including an object material may be positioned on an optical path of the first light. The reference member including a reference material for calibrating a concentration of the object material may be positioned on an optical path of the second light. The first reflective mirror may reflect the second light to the reference member. The rotatable disk may include a passing portion configured to pass the first light via the object therethrough and a reflecting portion configured to reflect the second light via the reference material. The receiver may be configured to detect a wavelength of the first light and a wavelength of the second light sequentially incident to the receiver by rotating the disk. The controller may be configured to control operation of the concentration measurement device. The controller may compare the wavelengths of the first and second lights with absorbance by the wavelength to calculate a concentration of the object material and a concentration of the reference material. The controller may compare the concentration of the object material with a reference concentration of the object material to obtain concentration control information. The controller may compare the concentration of the reference material with a normal concentration of the reference material to obtain correction information for a concentration calibration.

In various embodiments of the present disclosure, a concentration measurement and calibration method may include splitting a light, which may be emitted from a light source of a concentration measurement device, into a first light in a first direction and a second light in a second direction. The first light may be transmitted to a sample member including an object material. The second light may be transmitted to a reference member including a reference material for calibrating a concentration of the object material. A wavelength of the first light via the sample member and a wavelength of the second light via the reference member may be sequentially detected. The wavelengths of the first and second lights may be compared with absorbance by the wavelength to calculate a concentration of the object material and a concentration of the reference material. The concentration of the object material may be compared with a reference concentration of the object material to obtain concentration control information. The concentration of the reference material may be compared with a normal concentration of the reference material to obtain correction information for a concentration calibration.

According to various embodiments, the light may be continuously classified into the light for the concentration measurement and the light for the calibration of the concentration measurement device. Thus, the concentration measurement by the concentration measurement device and the calibration of the concentration measurement device may be performed in real time without stopping of a semiconductor fabrication process.

In various embodiments of the present disclosure, a concentration measurement device may include a beam splitter configured to split a light received from a light source into a first light and a second light. The concentration measurement device may include a first optical path configured to guide the first light first through a sample member and then to a rotatable disk and a second optical path configured to guide the second light first through a reference member and then to the rotatable disk. The rotatable disk including at least one passing portion configured to pass the first light and at least one reflecting portion configured to reflect the second light. The concentration measurement device may include a light receiver configured to detect a wavelength of the first light and a wavelength of the second light, which are sequentially becoming incident on the light receiver by a rotation of the disk. The concentration measurement device may include a controller comparing the wavelengths of the first and second lights to obtain a concentration of the object material and a concentration of the reference material. Wherein the controller compares the concentration of the object material with a reference concentration of the object material to obtain concentration control information, and wherein the controller compares the concentration of the reference material with a normal concentration of the reference material to obtain correction information for a concentration calibration.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are simplified schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
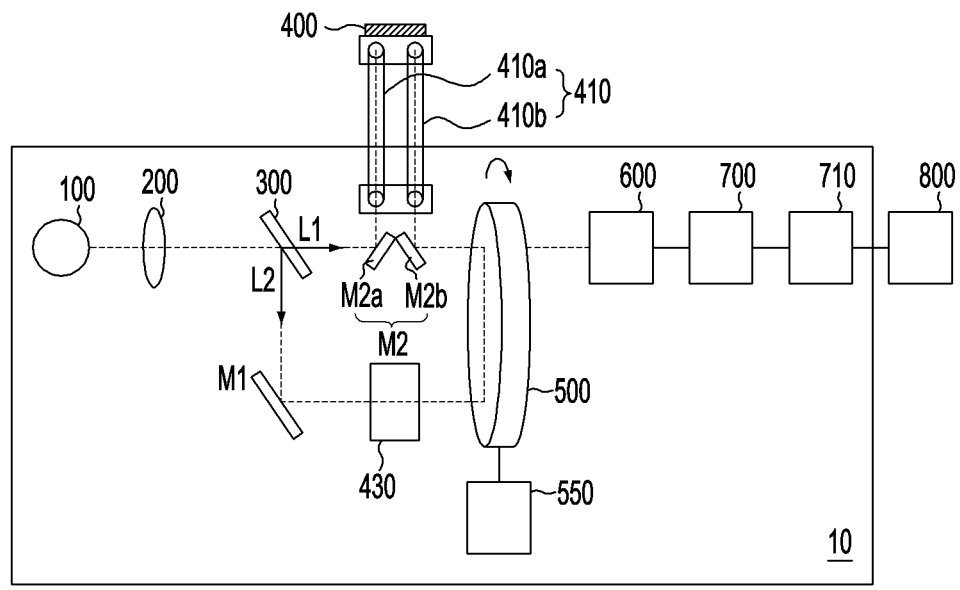
FIG. 1 is a view illustrating a concentration measurement device in accordance with various embodiments of the present disclosure.

FIG. 1 is a view illustrating a concentration measurement device including an optical cable in accordance with various embodiments of the present disclosure.

Referring to FIG. 1, a concentration measurement device 10 may include a light source 100, a light concentrator 200, a beam splitter 300, a first reflective mirror M1, a second reflective mirror M2, an optical cable 410, a reference member 430, a disk 500, a power driver 550, a light receiver 600, a controller 700 and a notice member 710.

The light source 100 may be configured to emit a light. The light emitted from the light source 100 may include a white light having a multi-wavelength, not restricted within a specific light.

The light concentrator 200 may be configured to concentrate the light emitted from the light source 100 on the light concentrator 200. The light concentrator 200 may then transmit the concentrated light to the beam splitter 300.

The beam splitter 300 may be configured to reflect a part of the light and pass a part of the light therethrough. For example, the beam splitter 300 may include a semi-transparent mirror. The beam splitter 300 may be configured to split the light transmitted from the light concentrator 200 into a first light L1 in a first direction and a second light L2 in a second direction. A first light L1 is passed by a beam splitter 300 and a second light L2 is a reflected by a beam splitter 300

In FIG. 1, a sample member 400 including an object material for concentration measurement may be positioned outside the concentration measurement device 10. The object material may include a liquid applied to a semiconductor process. The liquid may not be restricted to any specific liquid.

The optical cable 410 may be connected with the sample member 400 outside the concentration measurement device 10 to form an optical path. The optical cable 410 may be configured to transmit the first light L1 split by the beam splitter 300 to the sample member 400 via a first cable 410a (also referred to as an entry cable) and to receive the first light L1 through a second cable 410B (also referred to as the exit cable) after it has passed through the sample member 400. The first light L1 received in the second cable 410*b* of the optical cable 410 via the sample member 400 may then be sent to the disk 500 using the second reflective mirror M2.

The second reflective mirror M2 may be positioned between the beam splitter 300 and the disk 500. The second reflective mirror M2 may include a first reflecting portion M2*a* operatively coupled to an entrance of the optical cable 410 and a second reflecting portion operatively coupled to an exit of the optical cable 410. The first reflecting portion of the second reflective mirror M2 may be configured to reflect the first light L1 split by the beam splitter 300 toward the entrance of the entry cable 410*a* of the optical cable 410. The second reflecting portion M2*b* of the second reflective mirror M2 may be configured to reflect the first light L1 received from the sample member 400 through the exit cable 410*b* of the optical cable 410 toward the disk 500.

The first reflective mirror M1 may be configured to induce the second light L2 split by the beam splitter 300 to the reference member 430 including a reference material for concentration calibration. The reference material may have a fixed concentration. The fixed concentration may be used as a normal concentration of the reference material. The reference material may include a gas or a liquid, for example, air or water.

The second light L2 via the reference member 430 may be sent to the disk 500.

Figure 2:
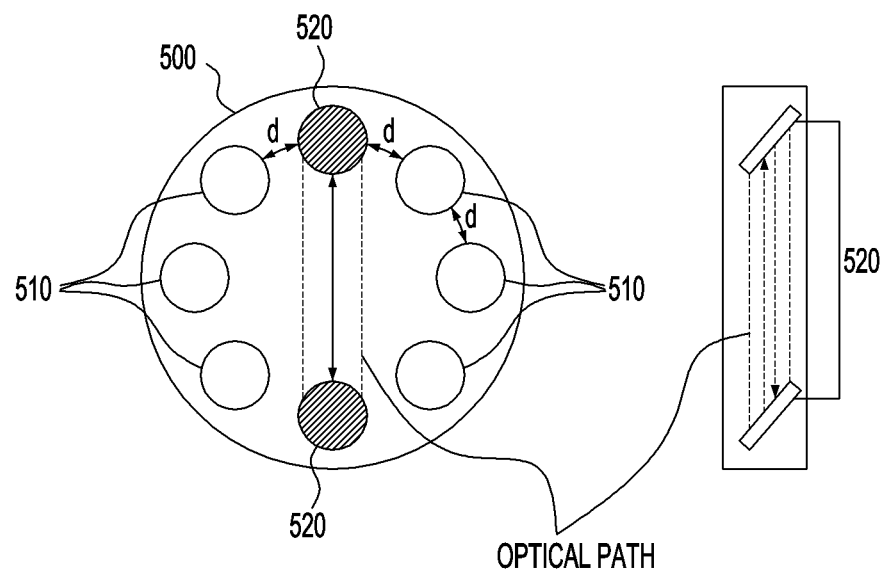
FIG. 2 is a front and side view illustrating a disk employed in the concentration measurement device of FIG. 1 in accordance with various embodiments of the present disclosure.

FIG. 2 is a front and side view illustrating the disk 500 in accordance with various embodiments of the present disclosure.

Referring to FIG. 2, the disk 500 may have a rotatable structure. The disk 500 may include a plurality of passing portions 510 and a plurality of reflecting portions 520. The passing portions 510 may be configured to pass the first light L1 via the object material therethrough. The reflecting portions 520 may be configured to reflect the second light L2 via the reference material. The passing portions 510 may be no less than 2n in number (n is a natural number). The reflecting portions 520 may be no less than 2n in number (n is a natural number). The passing portions 510 may be arranged symmetrically with each other with respect to a circumference of the disk 500. Further, the reflecting portions 520 may be arranged symmetrically with each other with respect to the circumference of the disk 500.

The passing portions 510 may allow the first light L1 via the sample member 400 to pass therethrough. The passing portions 510 may transmit the first light L1 to the light receiver 600. The passing portions 510 may include an interference filter or a pin hole. When the passing portions 510 include the interference filter, the passing portions 510 may selectively transmit a light having a necessary wavelength band among the first light L1 to the light receiver 600. When the passing portions 510 include the pin hole, the passing portion 510 may transmit the first light L1 having the wavelength to the light receiver 600 without filtering the first light L1. The pin hole type passing portions 510 may be applied to the light receiver 600 having a spectrum function, not restricted within a specific function.

The reflecting portions 520 may be configured to reflect the second light L2 via the reference member 430.

The reflecting portions 520 may be arranged symmetrically with each other with respect to a circumference of the disk 500. Further, the reflecting portions 520 may be arranged parallel to each other.

Figure 3A:
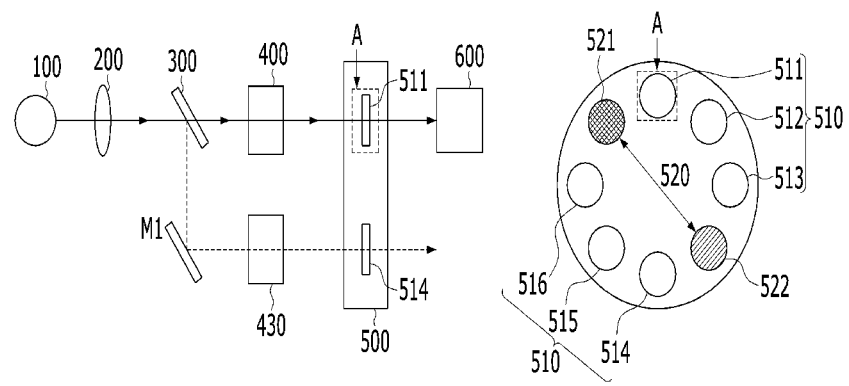
FIG. 3A is a view illustrating an optical path by disk positions in accordance with various embodiments of the present disclosure.
Figure 3B:
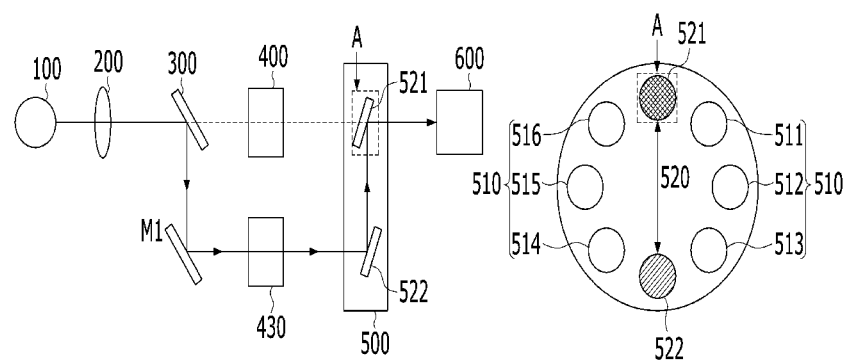
FIG. 3B is a view illustrating an optical path by disk positions in accordance with various embodiments of the present disclosure.
Figure 3C:
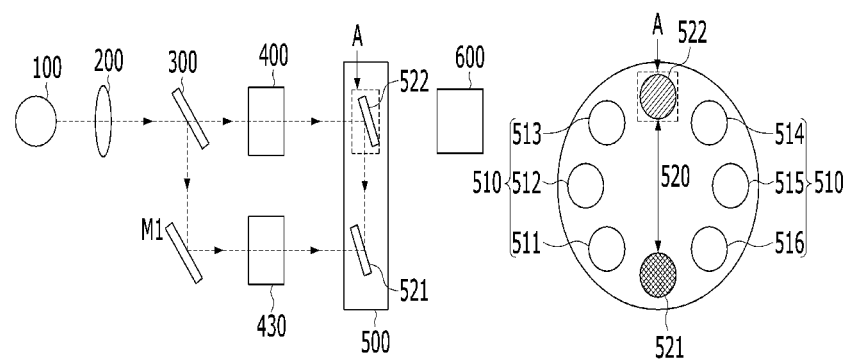
FIG. 3C is a view illustrating an optical path by disk positions in accordance with various embodiments of the present disclosure.

Particularly, the symmetrically arranged reflecting portions 521 and 522 in FIGS. 3B and 3C may be parallel to each other. The symmetrically arranged reflecting portions 521 and 522 may be configured to induce the second light L2 to the light receiver 600 or not to the light receiver 600 by the rotation of the disk 500.

For example, the second light L2 transmitted from the reference member 430 may be incident to the light receiver 600 through an optical path by the symmetrical and parallel reflecting portions 520. The optical path may correspond to a path through which a light may be transmitted between the reflecting portions 520 symmetrically with each other with respect to the circumference of the disk 500. Alternatively, the second light L2 transmitted from the reference member 430 may not be incident to the light receiver 600 through an optical path by the symmetrical and parallel reflecting portions 520.

As shown in FIG. 2, the passing portion 510 and the reflecting portion 520 may be arranged spaced apart from each other by a uniform gap d around the disk 500. In an embodiment, each of the passing and reflecting portions 510 and 520 may be positioned at an equal distance from a center of the disk 500. As an example, the ratio of the number of the passing portions 510 and the reflecting portions 520 may be 3:1 as shown in FIG. 2, but is not limited thereto, and the number of the passing portions 510 and the reflecting portions 520 can be changed according to the needs of the user.

For example, as shown in FIG. 3A, the reflecting portion 521, the passing portion 511, the passing portion 512, the passing portion 513, the reflecting portion 522, the passing portion 514, the passing portion 515 and the passing portion 516 may be sequentially arranged around the disk 500.

The power driver 550 may be configured to transmit a rotary power to the disk 500. The power driver 550 may be configured to control a rotation speed of the disk 500 in accordance with the control of the controller 700. Further, the power driver 550 may be configured to control a time interval between the first light L1 and the second light L2 transmitted to the light receiver 600 in accordance with the rotation speed of the disk 500.

FIGS. 3A to 3C are views illustrating optical paths defined by the disk positions in accordance with various embodiments of the present disclosure.

Hereinafter, for convenience of description, reference numerals 521 and 522 may indicate the reflecting portions 520 and reference numerals 511, 512, 513, 514, 515 and 516 may indicate the passing portions 510 in accordance with positions of the disk 500.

Referring to FIG. 3A, the passing portions 510 of the disk 500 may be located at a reference position A. The reference position A may be a position to which the first light via the sample member 400 may reach.

When the passing portions 510 of the disk 500 are located at the reference position A, the passing portions 510 may allow the first light to pass therethrough so that the first light may be transmitted to the light receive 600. Because the light receiver 600 may be positioned on an optical path of the first light parallel to the passing portion 511 at the reference position A, the light receiver 600 may not receive the second light passing through the reference member 430.

Referring to FIG. 3B, the reflecting portions 520 of the disk 500 may be located at a reference position A so that the second light may be received in the light receiver 600.

Hereinafter, an upper portion may correspond to the reference position A in the disk 500 and a lower portion may correspond to a position symmetrical with the reference position A with respect to the circumference of the disk 500.

The lower reflecting portion 522 may be configured to reflect the second light passing through the reference member 430 toward the upper reflecting portion 521. The upper reflecting portion 521 may be configured to induce the second light to the light receiver 600.

The upper reflecting portion 521 may be configured to reflect the first light transmitted from the sample member 400 in a direction on which the light receiver 600 may not be positioned. Thus, the first light may not be received in the light receiver 600.

Referring to FIG. 3C, the reflecting portion 522 of the disk 500 may be located at a reference position A so that the first and second lights may not be received in the light receiver 600.

FIG. 3C shows the reflecting portion 522 at the reference position A by rotating the reflecting portion 522 in FIG. 3B at an angle of about 180°. Because the reflecting portions 521 and 522 may be fixed, the positions of the reflecting portions 521 and 522 may be changed to alter reflection angles of the light by the reflecting portions 521 and 522. In FIG. 3C, the second light may be incident to the lower reflecting portion 521. Thus, the lower reflecting portion 521 may reflect the second light in a direction opposite to the direction in FIG. 3B so the second light may not be reflected by the upper reflecting portion 522.

Therefore, the upper reflecting portion 522 may not allow the first light to be incident to the light receiver 600.

As mentioned above, the first light or the second light may be received in the light receiver 600 in accordance with the positions of the disk 500.

The light receiver 600 may be configured to detect a wavelength of the first light and a wavelength of the second light sequentially incident to the light receiver 600 by the rotation of the disk 500. The light receiver 600 may be configured to convert the detected first and second lights into electrical signals.

The light receiver 600 may include a light receiving device with a spectrum function or without the spectrum function. The light receiving device with the spectrum function may include a spectrometer using a photodiode array (PDA), an image sensor, etc. The light receiving device without the spectrum function may include a photodiode, a photo transistor, etc.

For example, when the object material includes a plurality of ingredients having concentrations to be detected, the passing portions 510 may include an interference filter or the light receiver 600 may include the light receiving device with the spectrum function. Further, when the object material includes a plurality of ingredients having concentrations to be detected, it may be required to sort necessary wavelength bands. The sorting of the necessary wavelength bands may be performed by the interference filter of the passing portions 510 or the light receiver 600 including the light receiving device with the spectrum function.

Figure 4:
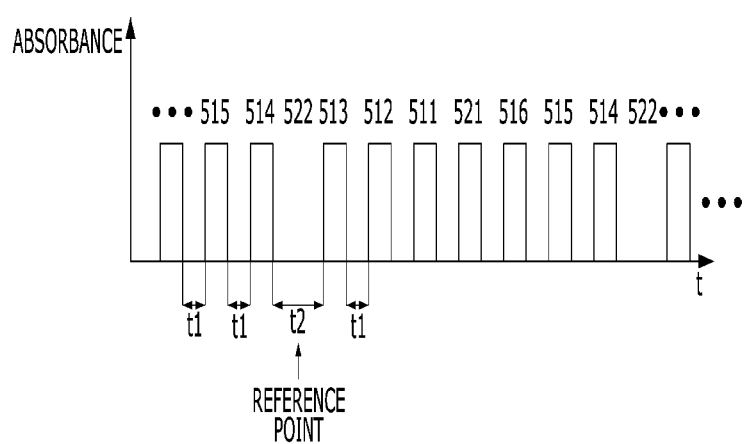
FIG. 4 is a graph showing wavelengths of lights by time in accordance with various embodiments of the present disclosure.

FIG. 4 is a graph showing wavelengths of lights by time in accordance with various embodiments of the present disclosure.

The first light or the second light may be continuously received in the light receiver 600 by the rotation of the disk 500. Because the passing portions 510 and the reflecting portions 520 may be arranged spaced apart from each other by the uniform gap d in the disk 500 and the disk 500 may also be rotated at a constant speed, the light receiver 600 may detect the wavelength of the first light or the second light by a same time interval t1. Further, the controller 700 may also receive the wavelength of the first light or the second light by the same time interval t1. In various embodiments, the wavelength of the first light passing through the object material and the wavelength of the second light passing through the reference material may be successively monitored so that the concentration measurement and the concentration calibration may be simultaneously performed.

The controller 700 may be configured to control whole operations of the concentration measurement device 10.

The controller 700 may be configured to classify the light transmitted from the light receiver into the first light and the second light.

As shown in FIG. 4, the controller 700 may receive the wavelength of the first light or the second light by the same time interval t1. The time interval t1 of the wavelength of the first light or the second light transmitted from the light receiver 600 may be beyond a reference time interval t2. This case may be generated when the first and second lights are not received in the light receiver 600 in FIG. 3C.

The controller 700 may determine the time interval t1 beyond the reference time interval t2 as a reference point. The reference point may be defined as an initial point at which detected values transmitted from the light receiver 600 may be classified into the first light and the second light by the controller 700.

The controller 700 may classify the light transmitted from the light receiver 600 into the first light and the second light in accordance with the positions and numbers of the passing portions 510 and the reflecting portions 520 in the disk 500.

For example, measured values in FIG. 4 may be classified into the first light and the second light referred to FIG. 3C. When the reference point is the time interval t1 beyond the reference time interval t2, the reference point may be a time when the reflecting portion 522 of the disk 500 may be located at the reference position A in FIG. 3C where the first light and second light may not be received in the light receiver 600. When the disk 500 is rotated in a clockwise direction, the light may be sequentially incident to the passing portion 513, the passing portion 512, the passing portion 511, the reflecting portion 521, the passing portion 516, the passing portion 515 and the passing portion 514 with respect to the reference point. Thus, the light may be classified into the first light, the first light, the first light, the second light, the first light, the first light and the first light with respect to the reference point.

After classifying the light transmitted from the light receiver 600 into first light and the second light, the controller 700 may compare the wavelengths of the first and second lights with absorbance by wavelength to calculate the concentrations of the object material and the reference material. The absorbance may be an amount representing a light intensity absorbed when a light passes through a liquid. Because the light intensity absorbed when the light passes through the liquid may be changed in accordance with the concentration of the object material, the concentration of the object material may be calculated using the light intensity.

For example, when the object material includes a plurality of ingredients having concentrations to be detected and the first light has a plurality of wavelengths, the controller 700 may compare each of the wavelengths with the absorbance by the wavelength to calculate the concentration of each of the wavelengths in the first light.

The controller 700 may compare the calculated concentration of the object material with a reference concentration of the object material to calculate concentration control information.

The controller 700 may compare the calculated concentration of the reference material with a normal concentration of the reference material to calculate correction information for the concentration calibration.

The concentration of the object material may be a detected concentration of an object material used for manufacturing the semiconductor fabrication process. The detected concentration of the object material may be changed in the semiconductor fabrication process.

The reference concentration of the object material may be a set concentration of the object material to be applied to the semiconductor fabrication process. The set concentration of the object material may be a fixed value.

The concentration of the reference material may be a concentration of the reference material measured by the concentration measurement device in the semiconductor fabrication process. The concentration of the reference material may be changed in accordance with performances of the concentration measurement device.

The normal concentration of the reference material may be an original concentration of the reference material. The normal concentration of the reference material may be a fixed value.

The controller 700 may calculate the concentrations of the object material and the reference material. The controller 700 may compare the calculated concentrations with each other to obtain the concentration control information and the correction information for the concentration calibration.

For example, the controller 700 may calculate the concentration of the object material and the concentration control information whenever the first light is transmitted to the controller 700 from the light receiver 600 or the concentration of the reference material and the correction information for the concentration calibration whenever the second light is transmitted to the controller 700 from the light receiver 600.

Alternatively, the controller 700 may be configured to accumulate information of the first light transmitted from the light receiver 600. The controller 700 may then average the accumulated information by m units (m is a natural number) to calculate the concentration of the object material and the concentration control information. Further, the controller 700 may be configured to accumulate information of the second light transmitted from the light receiver 600. The controller 700 may then average the accumulated information by m units (m is a natural number) to calculate the concentration of the reference material and the correction information for the concentration calibration. The information of the first light may include the wavelength of the first light. The information of the second light may include the wavelength of the second light.

Furthermore, the controller 700 may control the power driver 550 of the disk 500 to change the rotation speed of the disk 500, thereby controlling incident speeds of the first and second lights to the light receiver 600.

The notice member 710 may be configured to notice at least one of the concentration of the object material, the concentration control information of the object material, the concentration of the reference material, and the correction information for the concentration calibration by the controller 700.

Figure 5:
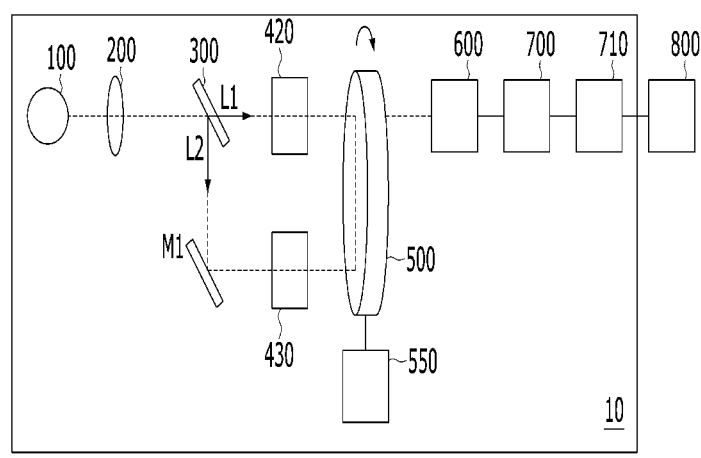
FIG. 5 is a view illustrating a concentration measurement device in accordance with various embodiments of the present disclosure.

FIG. 5 is a view illustrating a concentration measurement device in accordance with various embodiments of the present disclosure.

Referring to FIG. 5, a concentration measurement device 10 may include a light source 100, a light concentrator 200, a beam splitter 300, a first reflective mirror M1, a sample member 420, a reference member 430, a disk 500, a power driver 550, a light receiver 600, a controller 700 and a notice member 710.

The light source 100 may be configured to emit a light.

The light concentrator 200 may be configured to concentrate the light emitted from the light source 100 on the light concentrator 200. The light concentrator 200 may then transmit the concentrated light to the beam splitter 300.

The beam splitter 300 may be configured to split the light transmitted from the light concentrator 200 into a first light L1 in a first direction and a second light L2 in a second direction.

In FIG. 5, the sample member 420 including an object material for concentration measurement may be positioned in the concentration measurement device 10.

The sample member 420 including the object material for the concentration measurement may be positioned on an optical path of the first light L1 split by the beam splitter 300. The first light L1 may be incident to the disk 500 via the sample member 420.

The first reflective mirror M1 may be configured to direct the second light L2 split by the beam splitter 300 to the reference member 430 which includes a reference material for concentration calibration.

The disk 500 may have a rotatable structure. The disk 500 may include at least one passing portion 510 and at least one reflecting portion 520. The at least one passing portion 510 may be configured to pass the first light L1 via the object material therethrough. The at least one reflecting portion 520 may be configured to reflect the second light L2 via the reference material.

Each of the at least one passing portion 510 and the at least one reflecting portion 520 may be no less than 2n in number (n is a natural number). A plurality of passing portions 510 may be arranged symmetrically with each other with respect to a circumference of the disk 500. Further, the reflecting portions 520 may be arranged symmetrically with each other with respect to the circumference of the disk 500.

The passing portions 510 may include an interference filter or a pin hole.

The reflecting portions 520 may be arranged symmetrically with each other with respect to a circumference of the disk 500. Further, the reflecting portions 520 may be arranged parallel to each other.

The light receiver 600 may be configured to detect a wavelength of the first light and a wavelength of the second light sequentially incident to the light receiver 600 by the rotation of the disk 500.

The light receiver 600 may include a light receiving device with a spectrum function or without the spectrum function.

The controller 700 may be configured to control whole operations of the concentration measurement device 10. Particularly, the controller 700 may compare the wavelengths of the first and second lights with absorbance by wavelength to calculate the concentrations of the object material and the reference material. The controller 700 may compare the calculated concentration of the object material with a reference concentration of the object material to calculate concentration control information. The controller 700 may compare the calculated concentration of the reference material with a normal concentration of the reference material to calculate correction information for the concentration calibration.

In order to calculate the concentrations of the object material and the reference material based on the wavelengths of the first and second lights by the controller 700, it may be required classify the light into the first light and the second light.

When the reference point is the time interval t1 beyond the reference time interval t2, the controller 700 may classify the light transmitted from the light receiver 600 into the first light and the second light in accordance with the positions and numbers of the passing portions 510 and the reflecting portions 520 in the disk 500.

FIG. 5 may show the first light substantially the same as the first light in FIG. 1 except for the optical path of the first light where the first light split by the beam splitter 300 may reach to the disk 500 via the sample member 420 in the concentration measurement device 10.

Figure 6:
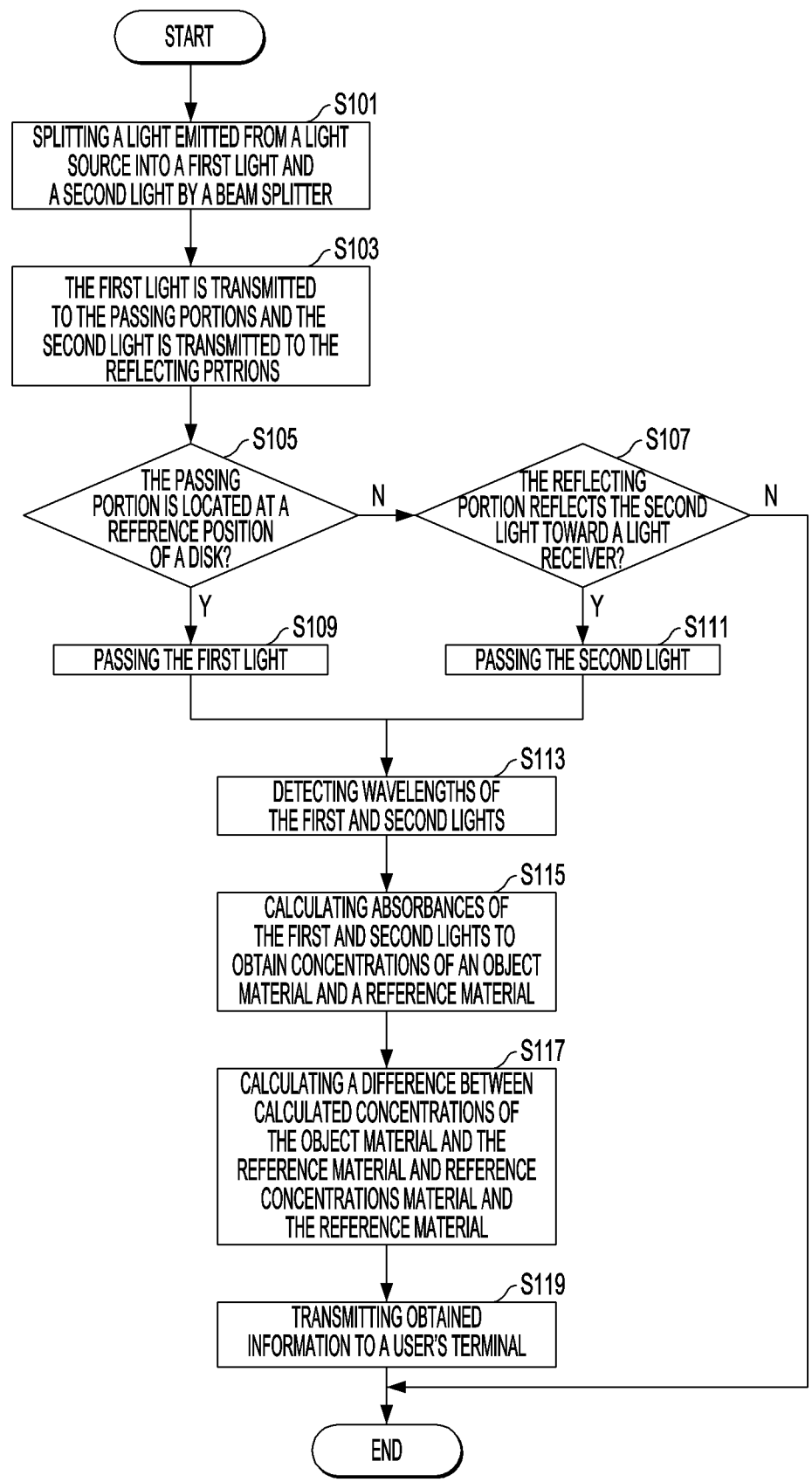
FIG. 6 is a flow chart of a concentration measurement and calibration method in accordance with various embodiments of the present disclosure.

FIG. 6 is a flow chart illustrating a concentration measurement and calibration method in accordance with various embodiments of the present disclosure.

Referring to FIG. 6, in operation S101, the concentration measurement device 10 may split the light emitted from the light source 100 into a first light in a first direction and a second light in a second direction.

In operation S103, the concentration measurement device 10 may transmit the first light in the first direction to the sample member 400 including the object material. The concentration measurement device 10 may transmit the second light in the second direction to the reference member 430 including the reference material.

The concentration measurement device 10 may induce the first light to pass through the passing portions 510 and the second light to the reflecting portions 520 by the rotation of the disk 500.

Particularly, the concentration measurement device 10 may include the disk 500. The disk may include the passing portions 510 and the reflecting portions 520. The passing portions 510 may be configured to pass the first light via the object material therethrough. The reflecting portions 520 may be configured to reflect the second light via the reference material. As shown in FIG. 3A, when the passing portions 510 of the disk 500 are located at the reference position A in operation S105, the concentration measurement device 10 may transmit the first light passing through the sample member 400 to the passing portions 510 and the first light may then become incident to the light receiver 600 S109.

As shown in FIG. 3B, when the passing portions 510 of the disk 500 are not located at the reference position A in operation S105 and the reflecting portion 521 reflect the second light to the light receiver 600 in operation S107, the concentration measurement device 10 may transmit the second light passing through the reference member 430 to the light receiver 600 via the reflecting portions 521 and 522 in operation S111.

As shown in FIG. 3C, when the reflecting portion 522 does not reflect the second light to the light receiver 600 in operation S107, the first and second lights may not be received in the light receiver 600.

In operation S113, the concentration measurement device 10 may sequentially detect the wavelength of the first light via the sample member 400 and the wavelength of the second light via the reference member 430.

The concentration measurement device 10 may classify the light into the first light and the second light.

In an embodiment, the concentration measurement device 10 may identify whether the time interval of the first light or the second light may be beyond the reference time interval or not. When the time interval of the first light or the second light is beyond the reference time interval, the concentration measurement device 10 may identify whether a detected light may be the first light or the second light based on the positions and the numbers of the passing portion 510 and the reflecting portion 520 in the disk 500 with respect to the reference point. Furthermore, the concentration measurement device 10 may also identify a sequence of the first light and the second light.

In operation S115, the concentration measurement device 10 may compare the wavelengths of the first and second lights with the absorbance by the wavelength to calculate the concentration of the object material and the concentration of the reference material.

For example, the concentration measurement device 10 may compare the first light with the absorbance by the wavelength to calculate the concentration of the object material whenever the first light may be detected and compare the second light with the absorbance by the wavelength to the calculate the concentration of the reference material whenever the second light may be detected.

Alternatively, the concentration measurement device 10 may accumulate the information of the first light transmitted from the light receiver 600. The concentration measurement device 10 may then average the accumulated information by m units (m is a natural number) to calculate the concentration of the object material. Further, the concentration measurement device 10 may accumulate information of the second light transmitted from the light receiver 600. The concentration measurement device 10 may then average the accumulated information by m units (m is a natural number) to calculate the concentration of the reference material.

In operation S117, the concentration measurement device 10 may compare the calculated concentration of the object material with the reference concentration of the object material to obtain the concentration control information. Further, the concentration measurement device 10 may compare the calculated concentration of the reference material with the normal concentration of the reference material to obtain the correction information for the concentration calibration.

The concentration measurement device 10 may compare the concentration of the object material with the reference concentration of the object material whenever the first light may be detected to obtain the concentration control information. Alternatively, the concentration measurement device 10 may accumulate the information of the detected first light. The concentration measurement device 10 may compare the concentration of the object material with the reference concentration of the object material to obtain the concentration control information.

The concentration measurement device 10 may compare the concentration of the reference material with the normal concentration of the reference material whenever the second light is detected to obtain the correction information for the concentration calibration. Alternatively, the concentration measurement device 10 may accumulate the information of the detected second light. The concentration measurement device 10 may compare the concentration of the reference material with the normal concentration of the reference material to obtain the correction information for the concentration calibration.

In operation S119, the concentration measurement device 10 may notify at least one of the concentration of the object material, the concentration control information of the object material, the concentration of the reference material, and the correction information for the concentration calibration to a user's terminal 800.

According to various embodiments, the concentration measurement by the concentration measurement device and the calibration of the concentration measurement device may be performed in real time without stopping of a semiconductor fabrication process.

It may be required to monitor the concentration of the object material in the liquid used for the semiconductor fabrication process in real time. When the concentration of the object material is beyond an allowable range, an error may be generated in the semiconductor fabrication process. Further, it may be required to monitor the performance change of the concentration measurement device. When the performance of the concentration measurement device is changed due to a deterioration of a light source, a sensitivity of a measurement member, etc., an accurate concentration may be calculated to generate an error of the semiconductor fabrication process.

According to various embodiments, the concentration of the object material may be monitored using the first light via the object material. The performance of the concentration measurement device may be monitored using the second light via the reference material.

Therefore, the concentration of the object material may be controlled in real time. Further, the correction information for the concentration calibration may be applied to the concentration measurement device to correct the changed data caused by the performance change of the concentration measurement device.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are apparent in view of the present disclosure and are intended to fall within the scope of the appended claims.

What is claimed is:

1. A concentration measurement device comprising:
    a light source configured to emit a light;
    a beam splitter configured to split the light into a first light in a first direction and a second light in a second direction;
    an optical cable operatively connected with a sample member, which includes an object material, through an optical path to transmit the first light to the sample member and to receive the first light via the sample member;
    a reference member positioned on an optical path of the second light, the reference member including a reference material for a concentration calibration;
    a first reflective mirror configured to reflect the second light toward the reference member;
    a rotatable disk including a passing portion configured to pass the first light via the object material therethrough and a reflecting portion configured to reflect the second light via the reference material;
    a light receiver configured to detect a wavelength of the first light and a wavelength of the second light, which are sequentially incident to the light receiver, by a rotation of the disk; and
    a controller configured to control operations of the concentration measurement device,
    wherein the controller compares the wavelengths of the first and second lights with an absorbance by a wavelength to obtain a concentration of the object material and a concentration of the reference material, the controller compares the concentration of the object material with a reference concentration of the object material to obtain concentration control information, and the controller compares the concentration of the reference material with a normal concentration of the reference material to obtain correction information for a concentration calibration.

2. The concentration measurement device of claim 1, wherein each of the passing portion and the reflecting portion include no less than 2n passing and reflecting portions, respectively, where n is a natural number,
    wherein the passing portions are arranged symmetrically with each other with respect to a circumference of the disk, and
    wherein the reflecting portions are arranged symmetrically with each other with respect to the circumference of the disk.

3. The concentration measurement device of claim 2, wherein the reflecting portions are symmetrically positioned with respect to the circumference of the disk and are parallel to each other.

4. The concentration measurement device of claim 2, wherein the controller identifies whether the light transmitted from the light receiver corresponds to the first light or the second light in accordance with positions and numbers of the passing portions and the reflecting portions in the disk at a point when a reception interval time of the first light or the second light is beyond a reference interval time as a reference point.

5. The concentration measurement device of claim 4, wherein the controller obtains the concentration and the concentration control information of the object material whenever the first light is transmitted from the light receiver or the controller accumulates information of the first light transmitted from the light receiver and averages the accumulated information by m numbers, where m is a natural number, to obtain the concentration and the concentration control information of the object material, and
    wherein the controller obtains the concentration and the correction information for the concentration calibration of the reference material whenever the first light is transmitted from the light receiver or the controller accumulates information of the second light transmitted from the light receiver and averages the accumulated information by m numbers, where m is a natural number, to obtain the concentration and the correction information for the concentration calibration of the reference material.

6. The concentration measurement device of claim 1, wherein the controller is configured to control a rotation speed of the disk to change speeds of the first and second lights incident to the light receiver.

7. The concentration measurement device of claim 1, wherein the passing portion comprises an interference filter or a pin hole.

8. The concentration measurement device of claim 1, wherein the passing portion comprises at least one of a light receiving device with a spectrum function and a light receiving device without a spectrum function.

9. The concentration measurement device of claim 1, wherein the object material comprises a plurality of ingredients, and the passing portion comprises an interference filter or a light receiving device with a spectrum function.

10. The concentration measurement device of claim 9, wherein the object material comprises a plurality of ingredients and the first light has a plurality of wavelengths, and
    wherein the controller compares each of the wavelengths with the absorbance by the wavelength to obtain concentrations of the wavelengths in the first light.

11. The concentration measurement device of claim 1, further comprising a second reflective mirror configured to reflect the first light toward the optical cable and to reflect the first light received through the optical cable via the sample member toward the disk.

12. The concentration measurement device of claim 1, further comprising a light concentrator configured to concentrate the light emitted from the light source and to transmit the concentrated light to the beam splitter.

13. The concentration measurement device of claim 1, further comprising a power driver configured to rotate the disk.

14. A concentration measurement device comprising:
a light source configured to emit a light;
a beam splitter configured to split the light into a first light in a first direction and a second light in a second direction;
a sample member positioned on an optical path of the first light, the sample member including an object material;
a reference member positioned on an optical path of the second light, the reference member including a reference material for a concentration calibration;
a first reflective mirror configured to reflect the second light toward the reference member;
a rotatable disk including a passing portion configured to pass the first light via the object material therethrough and a reflecting portion configured to reflect the second light via the reference material;
a light receiver configured to detect a wavelength of the first light and a wavelength of the second light, which are sequentially incident to the light receiver, by a rotation of the disk; and
a controller configured to control operations of the concentration measurement device,
wherein the controller compares the wavelengths of the first and second lights with an absorbance by a wavelength to obtain a concentration of the object material and a concentration of the reference material,
wherein the controller compares the concentration of the object material with a reference concentration of the object material to obtain concentration control information, and
wherein the controller compares the concentration of the reference material with a normal concentration of the reference material to obtain correction information for a concentration calibration.

15. The concentration measurement device of claim 14, wherein each of the passing portion and the reflecting portion includes no less than 2n passing portions and reflecting portions respectively, where n is a natural number,
wherein the passing portions are arranged symmetrically with each other with respect to a circumference of the disk, and
wherein the reflecting portions are arranged symmetrically with each other with respect to the circumference of the disk.

16. The concentration measurement device of claim 15, wherein the reflecting portions are symmetrically positioned with respect to the circumference of the disk and are parallel to each other.

17. The concentration measurement device of claim 14, wherein the passing portion comprises an interference filter or a pin hole.

18. The concentration measurement device of claim 14, wherein the passing portion comprises a light receiving device with a spectrum function or a light receiving device without a spectrum function.

19. The concentration measurement device of claim 14, wherein the controller identifies whether the light transmitted from the light receiver corresponds to the first light or the second light in accordance with positions and numbers of the passing portion and the reflecting portion in the disk at a point when a reception interval time of the first light or the second light is beyond a reference interval time as a reference point.

20. A concentration measurement and calibration method comprising:
splitting a light, which is emitted from a light source, into a first light in a first direction and a second light in a second direction by a concentration measurement device;
transmitting the first light to a sample member including an object material;
transmitting the second light to a reference member including a reference material for a concentration calibration;
sequentially detecting a wavelength of the first light via the sample member and a wavelength of the second light via the reference member;
comparing the wavelengths of the first and second lights with an absorbance by a wavelength to obtain a concentration of the object material and a concentration of the reference material;
comparing the concentration of the object material with a reference concentration of the object material to obtain concentration control information; and
comparing the concentration of the reference material with a normal concentration of the reference material to obtain correction information for a concentration calibration,
wherein the concentration measurement device comprises a rotatable disk including a passing portion configured to pass the first light via the object material therethrough and a reflecting portion configured to reflect the second light via the reference material,
the concentration measurement and calibration method further comprising directing the first light to the passing portion and the second light to the reflecting portion by a rotation of the disk between transmitting the second light to the reference member and detecting the wavelengths of the first and second lights.

21. The concentration measurement and calibration method of claim 20, wherein detecting the wavelengths of the first and second lights comprises:
identifying whether a reception interval time of the first light or the second light is beyond a reference interval time; and
identifying whether the detected light corresponds to the first light or the second light in accordance with positions and numbers of the passing portion and the reflecting portion in the disk at a point when the reception interval time of the first light or the second light is beyond the reference interval time as a reference point.

22. The concentration measurement and calibration method of claim 20, wherein obtaining the concentrations of the object material and the reference material comprises calculating the concentration of the object material whenever the first light is detected and the concentration of the reference material whenever the second light is detected, or accumulating information of the detected first light and averaging the accumulated information by m numbers, where m is a natural number, to obtain the concentration of the object material and information of the detected second light and averaging the accumulated information by m numbers, where m is a natural number, to obtain the concentration of the reference material.

23. The concentration measurement and calibration method of claim 20, wherein obtaining the concentration control information and the correction information for the concentration calibration comprises comparing the concentration of the object material with the reference concentration of the object material whenever the first light is detected to obtain the concentration control information, or accumulating information of the detected first light and averaging the accumulated information by m numbers, where m is a natural number, and comparing the concentration of the object material with the reference concentration of the object material to obtain the concentration control information, and
wherein obtaining the concentration control information and the correction information for the concentration calibration comprises comparing the concentration of the reference material with the normal concentration of the reference material whenever the second light is detected to obtain the correction information for the concentration calibration, or accumulating information of the detected second light and averaging the accumulated information by m numbers, where m is a natural number, to obtain the correction information for the concentration calibration.

24. The concentration measurement and calibration method of claim 20, further comprising transmitting at least one of the concentration of the object material, the concentration control information of the object material, the concentration of the reference material and the correction information for the concentration calibration to a user's terminal, after obtaining the concentration control information and the correction information for the concentration calibration.

25. A concentration measurement device comprising:
a beam splitter configured to split a light received from a light source into a first light and a second light;
a first optical path configured to guide the first light first through a sample member and then to a rotatable disk;
a second optical path configured to guide the second light first through a reference member and then to the rotatable disk;
the rotatable disk including at least one passing portion configured to pass the first light and at least one reflecting portion configured to reflect the second light;
a light receiver configured to detect a wavelength of the first light and a wavelength of the second light, which are sequentially becoming incident on the light receiver, by a rotation of the disk; and
a controller comparing the wavelengths of the first and second lights to obtain a concentration of the object material and a concentration of the reference material,
wherein the controller compares the concentration of the object material with a reference concentration of the object material to obtain concentration control information, and
wherein the controller compares the concentration of the reference material with a normal concentration of the reference material to obtain correction information for a concentration calibration.

* * * * *